United States Patent
Kudo et al.

(10) Patent No.: US 11,729,512 B2
(45) Date of Patent: Aug. 15, 2023

(54) IMAGE CAPTURING DEVICE CAPTURES AN OBJECT IN AN ILLUMINATION ENVIRONMENT APPROPRIATE FOR INDIVIDUAL IDENTIFICATION AND OBJECT COLLATION

(71) Applicant: NEC Corporation, Tokyo (JP)

(72) Inventors: Yuta Kudo, Tokyo (JP); Rui Ishiyama, Tokyo (JP); Toru Takahashi, Tokyo (JP); Kengo Makino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 95 days.

(21) Appl. No.: 17/431,513

(22) PCT Filed: Feb. 26, 2019

(86) PCT No.: PCT/JP2019/007398
§ 371 (c)(1),
(2) Date: Aug. 17, 2021

(87) PCT Pub. No.: WO2020/174596
PCT Pub. Date: Sep. 3, 2020

(65) Prior Publication Data
US 2022/0141369 A1    May 5, 2022

(51) Int. Cl.
*H04N 23/71* (2023.01)
*G06V 10/145* (2022.01)
*H04N 23/74* (2023.01)

(52) U.S. Cl.
CPC ........... *H04N 23/71* (2023.01); *G06V 10/145* (2022.01); *H04N 23/74* (2023.01)

(58) Field of Classification Search
CPC ...... H04N 23/71; H04N 23/74; H04N 5/2351; H04N 5/2354; G06V 10/145; G06V 20/95;
(Continued)

(56) References Cited

U.S. PATENT DOCUMENTS 8,948,491 B2 * 2/2015 Sekiguchi .............. G01N 21/95
356/600
11,423,632 B2 * 8/2022 Kudo ................... G06V 10/145
(Continued)

FOREIGN PATENT DOCUMENTS

JP    2003240732 A    3/2003
JP    2008096429 A    4/2008
(Continued)

OTHER PUBLICATIONS

International Search Report for PCT Application No. PCT/JP2019/007398, dated May 7, 2019.
(Continued)

*Primary Examiner* — Luong T Nguyen

(57) ABSTRACT

An image capturing device, configured to illuminate an object by an illumination means and capture reflected light from the object as a reflection image by a capturing means, includes an irradiation angle range determination means. The irradiation angle range determination means determines, assuming that a group of pieces of unevenness existing at the same position on the surfaces of a plurality of individuals of an object is an unevenness group, an irradiation angle range for irradiating the object by the illumination means, on the basis of a statistic value of the inclination angles of the unevenness group in which variations in the inclination angles of the unevenness between individuals is larger than other unevenness groups, among the plurality of unevenness groups.

9 Claims, 18 Drawing Sheets

(58) Field of Classification Search
CPC ........ G06V 20/80; G06V 10/22; G01N 21/55; G06Q 30/018; G03B 15/02; G06T 1/0007
See application file for complete search history.

(56) References Cited

U.S. PATENT DOCUMENTS

| | | | |
|---|---|---|---|
| 2009/0015823 A1* | 1/2009 | Yoshikawa | G01N 21/4738 356/237.2 |
| 2016/0055398 A1 | 2/2016 | Ishiyama et al. | |
| 2018/0268214 A1 | 9/2018 | Kutter et al. | |
| 2018/0299386 A1 | 10/2018 | Masumura | |

FOREIGN PATENT DOCUMENTS

| | | | |
|---|---|---|---|
| JP | 2008202949 A | 9/2008 |
| JP | 2009008502 A | 1/2009 |
| JP | 5866586 B1 | 2/2016 |
| WO | 2014163014 A1 | 10/2014 |
| WO | 2017080975 A1 | 5/2017 |

OTHER PUBLICATIONS

PCT Communication in Cases for Which No Other Form is Applicable (Form IB345) dated Jul. 5, 2021, with PCT Third Party Observation (PCT Administrative Instructions Part 8) submitted on Jun. 25, 2021, both for PCT Application No. PCT/JP2019/007398.

* cited by examiner

IMAGE CAPTURING DEVICE CAPTURES AN OBJECT IN AN ILLUMINATION ENVIRONMENT APPROPRIATE FOR INDIVIDUAL IDENTIFICATION AND OBJECT COLLATION

This application is a National Stage Entry of PCT/JP2019/007398 filed on Feb. 26, 2019, the contents of all of which are incorporated herein by reference, in their entirety.

The present invention relates to an image capturing device, an image capturing method, and a storage medium.

BACKGROUND ART

Art called Fingerprint of Things authentication has been known. In the Fingerprint of Things authentication, fine unevenness naturally generated at a fine level that is equal to or lower than surface roughness defined as a quality standard, or fine unevenness applied by processing or the like, in particular, a random pattern generated by fine unevenness that is naturally generated by each processing and is different in each individual, is acquired as an image using a capturing device such as a camera, and the captured image is recognized, whereby each product is identified and managed.

As one of such art, Patent Literature 1 has been known. Patent Literature 1 discloses an information acquisition and identification system in which a satin pattern extracted from a captured image of the satin pattern formed on a component or a product and a previously stored image feature are collated with each other, whereby the component or the product is identified. Patent Literature 1 also discloses using an imaging aid having a light source unit for capturing a satin pattern. Patent Literature 1 describes that it is desirable to perform capturing under a constant illumination condition at all time.

Further, as related art, Patent Literature 2 has been known. Patent Literature 2 discloses an illumination device for inspection to detect minute defects. According to Patent Literature 2, in the illumination device for inspection, it is possible to change the shape and the size of an irradiation solid angle and an inclination angle of inspection light according to feature points of an inspected object, that is, changes caused at a defect portion.

Patent Literature 1: WO 2014/163014 A
Patent Literature 2: JP 5866586 B

SUMMARY

In order to realize individual identification and collation of an object with high accuracy by using a random pattern in which fine unevenness on a surface of an object is imaged, it is necessary to capture an image of the object under an appropriate illumination environment. However, it is difficult to capture an image of the object under an appropriate illumination environment.

An object of the present invention is to provide an image capturing device that solves the aforementioned problem.

An image capturing device, according to one aspect of the present invention, is an image capturing device configured to illuminate an object by illumination means and capture reflected light from the object as a reflection image by capturing means. The device includes irradiation angle range determination means for, assuming that a group of pieces of unevenness existing at the same position on surfaces of a plurality of individuals of an object is an unevenness group, determining an irradiation angle range for irradiating the object by the illumination means, on the basis of a statistic value of inclination angles of an unevenness group in which variations in the inclination angles of the unevenness between the individuals is larger than a statistic value of another unevenness group, among a plurality of the unevenness groups.

Further, an image capturing method, according to another aspect of the present invention, is an image capturing method for illuminating an object by illumination means and capturing reflected light from the object as a reflection image by capturing means. The method includes assuming that a group of pieces of unevenness existing at a same position on surfaces of a plurality of individuals of an object is an unevenness group, determining an irradiation angle range for irradiating the object by the illumination means, on the basis of a statistic value of inclination angles of an unevenness group in which variations in the inclination angles of the unevenness between individuals is larger than a statistic value of another unevenness group, among a plurality of unevenness groups.

Further, a computer-readable storage medium, according to another aspect of the present invention, stores a program for causing a computer to perform processing of, the computer constituting an image capturing device configured to illuminate an object by illumination means and capture reflected light from the object as a reflection image by capturing means:

assuming that a group of pieces of unevenness existing at a same position on surfaces of a plurality of individuals of an object is an unevenness group, determining an irradiation angle range for irradiating the object by the illumination means, on the basis of a statistic value of inclination angles of an unevenness group in which variations in the inclination angles of the unevenness between the individuals is larger than a statistic value of another unevenness group, among a plurality of the unevenness groups.

With the configurations described above, the present invention enables image capturing of an object under an illumination environment that is appropriate for individual identification and collation of the object.

EXEMPLARY EMBODIMENTS

First Exemplary Embodiment

Figure 1:
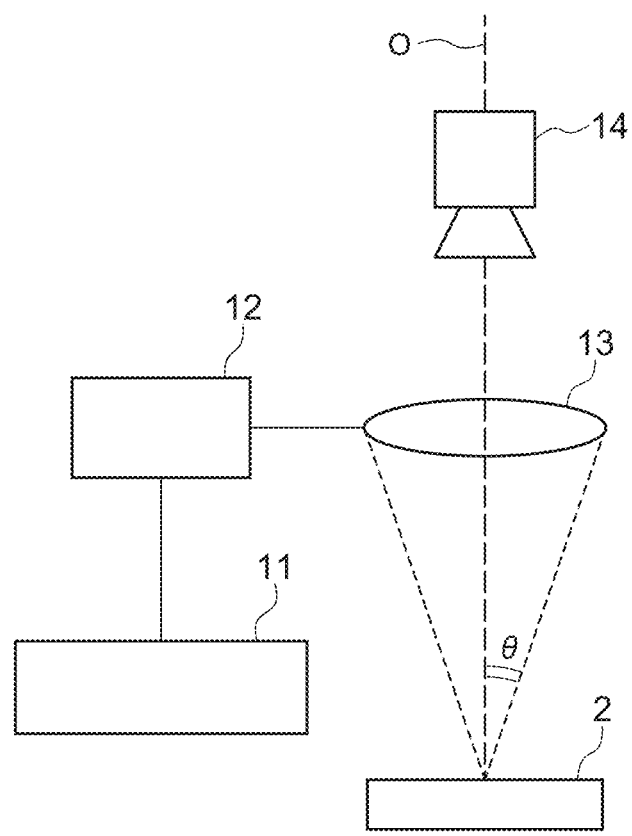
FIG. 1 illustrates an example of an overall configuration of an image capturing system according to a first exemplary embodiment of the present invention.

Hereinafter, an image capturing system 1 used for identifying an individual of an object will be described as a first exemplary embodiment of the present invention.

The image capturing system 1 of the present embodiment captures an image of an object 2 to be identified in order to identify an individual. As described below, the image capturing system 1 of the present embodiment includes a measurement means 11 for measuring unevenness existing on a surface of the object 2, and a control means 12 for determining an irradiation angle range when an illumination means 13 illuminates the object 2 on the basis of a measurement result by the measurement means 11. Note that the image capturing system 1 may be used for a purpose other than individual identification.

The object 2 is an industrial product, a product, a container, a packing article, a machine component, a part thereof, or goods or a component for manufacturing an industrial product or a product.

The material of the object 2 may be glass, ceramics, resin, fabric, leather, metal, other materials, or a processed or coated material. The image capturing system 1 of the present embodiment is applicable to any of the materials mentioned above.

The unevenness on a surface of the object 2 includes flaws, fine unevenness, and patterns that are naturally formed in the process of manufacturing and processing the object 2. In particular, on a product made of cast metal or resin using a mold or a pottery product, fine unevenness is formed on the surface thereof in the process of manufacturing. In a plurality of individuals manufactured using the same mold, the unevenness pattern differs in each individual. For example, in a plurality of individuals to which satin processing is applied, unevenness is formed at the same location, but the inclination angles of the formed unevenness are not completely the same in all individuals. A difference is caused in a fine level that is equal to or lower than the surface roughness defined as a quality standard. Such an inclination angle of the unevenness is one of object characteristics (shape). Therefore, identification and collation of an object can be performed on the basis of such a difference in the object characteristics. In particular, identification and collation are easier as the difference between individuals in the inclination angle of unevenness formed at the same location is larger. Examples of an object having such a large difference in inclination angle between individuals include an object to which satin processing or emboss processing is applied, and an object having roughness on the surface thereof.

FIG. 1 illustrates an example of an overall configuration of the image capturing system 1 (image capturing device). In the example of FIG. 1, the image capturing system 1 includes the measurement means 11, the control means 12, the illumination means 13, and the capturing means 14.

The measurement means 11 measures fine unevenness existing on a surface of the object 2 and acquires measurement data of the unevenness on the surface of the object 2. As the measurement means 11, a measurement device such as a confocal laser microscope (for example, VK-260 made by KEYENCE CORPORATION) or the like can be used. As the measurement means 11, any other general devices used for measuring unevenness may also be used.

The measurement means 11 is communicably connected with the control means 12. The measurement means 11 transmits unevenness measurement data, that is a measurement result, to the control means 12.

The control means 12 determines an irradiation angle range that is an illumination condition for illuminating the object 2 by the illumination means 13, on the basis of a measurement result by the measurement means 11. The control means 12 receives unevenness measurement data that is a measurement result of surface unevenness of the object 2, from the measurement means 11. Then, the control means 12 determines the irradiation angle range for illuminating the object 2 by the illumination means 13, on the basis of the received unevenness measurement data. In other words, the control means 12 determines from which angle range the object 2 is irradiated by the illumination means 13.

The illumination means 13 irradiates the object 2 with light under the illumination condition (irradiation angle range) determined by the control means 12. The illumination means 13 can be communicably connected with the control means 12 and the capturing means 14. The illumination means 13 is, for example, a coaxial epi-illumination device (for example, LV-27 or LFV3 made by CCS Inc., or the like). The illumination means 13 may be a dome-type lighting, a ring-type lighting, or the like. The illumination means 13 may have a shielding means 131 such as a diaphragm.

The illumination means 13 can be configured such that the irradiation angle range is controllable manually or by the control of the control means 12. In the present embodiment, a specific configuration for controlling the irradiation angle range is not particularly limited. For example, the illumination means 13 may include a housing with an opening at the lower end and a plurality of light sources provided to the housing. The light sources may be arranged in a ring shape. The illumination means 13 may control the light sources (lighting, extinction, adjustment of color and light amount, and the like) according to the irradiation angle range determined by the control means 12. Alternatively, the illumination means 13 may be configured to use a plurality of illumination means having different irradiation angle ranges separately, according to the irradiation angle range determined by the control means 12. The illumination means 13 may have a well-known configuration for controlling the irradiation angle range. The housing covers the object 2, and can be used as a shielding part for shielding light other than the light radiated from the illumination means 13. The housing may also have a structure to which the capturing means 14, described below, is attachable.

The light source of the illumination means 13 is a light-emitting diode (LED), a light bulb, an organic light-emitting diode, an incandescent light bulb, a fluorescent lamp, or the like. It can be selected appropriately in consideration of the amount of light of the irradiation light, easiness in control of illumination condition, and the like.

It is desirable that the light radiated from the illumination means 13 is light having a wavelength band in which the reflectance of the object 2 is low. That is, it is desirable that the light source of the illumination means 13 has radiation intensity of relatively high spectral distribution in a wavelength band in which the spectral reflectance is relatively low in the spectral reflectance characteristics of the object 2. For example, in the case where the surface of the object 2 is blue, it is preferable that the illumination means 13 radiates red light. Thereby, it is possible to suppress an influence of light components diffused and reflected by the object 2. As a result, light components that are mirror-reflected at the surface of the object 2 can be emphasized.

The capturing means 14 captures an image of the object 2 in a state where the illumination means 13 irradiates the object 2 with light. To the capturing means 14, reflected light from the object 2 enters. Image data captured by the capturing means 14 may be a color image or a black and white image.

The capturing means 14 is configured of a camera using a charge-coupled device (CCD) image sensor or a complementary metal oxide (CMOS) image sensor, and the like. The capturing means 14 is a device having a camera function such as a digital camera, a smartphone, a tablet terminal, a mobile phone, or the like, for example. The capturing means 14 may include a device having a camera function and an imaging aid. An imaging aid is a device such as a lens (wide angle lens, magnifying lens, telephoto lens, or the like) or another device for changing magnification, image angle, and resolution.

The capturing means 14 can be communicably connected with the control means 12 and the illumination means 13. The capturing means 14 can also be connected with an external information processing device having a screen display unit such as an LCD and an image processing unit, not shown. The capturing means 14 may have a function of transmitting captured image data to a screen display unit or an external information processing device.

Note that the image capturing system 1 may include a black shielding part that covers the periphery of the object 2 so as to prevent light other than the irradiation light from the illumination means 13 from entering the object 2. Alternatively, the irradiance of the irradiation light from the illumination means 13 may be set to be sufficiently higher than the irradiance of light other than the irradiation light. By setting it to have higher irradiance, it is possible to disregard the influence of light other than the irradiation light.

The illumination means 13 and the capturing means 14 are arranged to have a common optical axis O immediately above the object 2 in the vertical direction. However, the configuration of the image capturing system 1 to which the method of the present invention is applied is not limited to the case illustrated in the present embodiment. The illumination means 13 and the capturing means 14 may be arranged in a positional relation other than that illustrated in FIG. 1.

Figure 2:
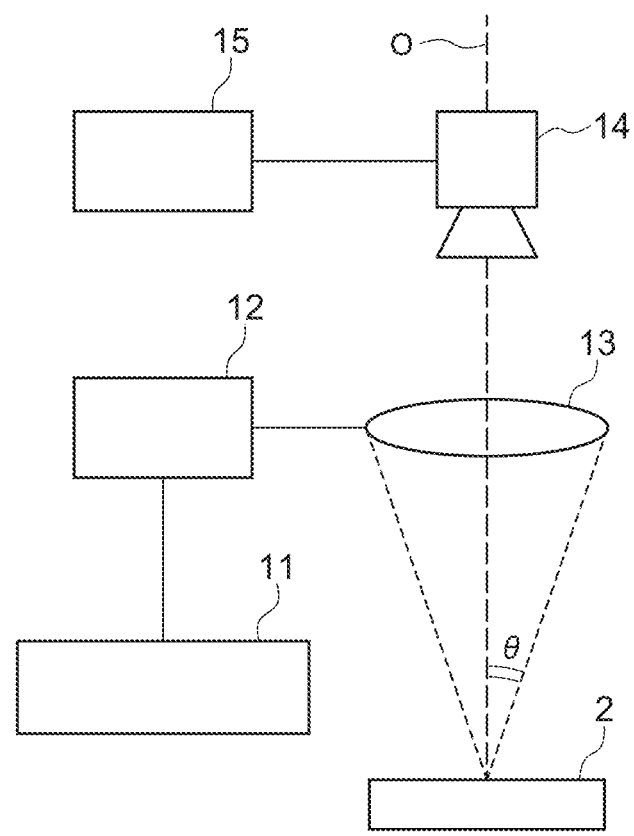
FIG. 2 illustrates a modification of the image capturing system according to the first exemplary embodiment of the present invention.

FIG. 2 illustrates a modification of the image capturing system 1. The image capturing system 1 of the modification of FIG. 2 includes the measurement means 11, the control means 12, the illumination means 13, the capturing means 14, and a collation means 15. The functions of the measurement means 11, the control means 12, and the illumination means 13 are the same as those of the example illustrated in FIG. 1 described above.

The capturing means 14 in the modification transmits captured image data to the collation means 15.

The collation means 15 uses the image data acquired from the capturing means 14 to perform identification, collection, and authenticity determination of an object. For example, the collation means 15 performs identification and collation processes of an object using information extracted from the acquired image data and information previously stored in a storage means such as a database. For example, the collation means 15 compares the feature amount of an image obtained from the received image data with the previously stored feature amount. As a result of comparison, when the feature amounts of the two match, the collation means 15 may determine that the collation target object and the object corresponding to the stored feature amount are identical.

The feature amount to be used for collation may be a feature point that is a characteristic point existing at an edge or a corner extracted from the image data. Alternatively, the feature amount may be a local feature amount that is a feature amount related to a feature point extracted from the image data. The local feature amount can be extracted from the feature point extracted from the image data and a pixel value of a nearby pixel.

The collation means 15 transmits a collection result to an external output means or a display means. A result of collation may be information or a message representing whether or not collation has succeeded. Alternatively, a result of collation may include information, a message (product No., manufacturing No., brand name, serial No., name of manufacturer, name of distribution dealer) or the like that can uniquely specify the identified individual. The external output means may transmit a collation result to, for example, a mobile terminal (smartphone, tablet, personal computer, mobile telephone, other terminals having a communication function and a display function) of a user to be collated, or a server used for providing services. A user can check a collation result by the website or an application for providing a collation service.

As described in the modification above, the present invention is applicable to an object identifying device 10 having the image capturing system 1 (image capturing device) and the collation means 15 for performing a predetermined collation process based on the image captured by the image capturing system 1. Note that the collation process described above is an example. The collation means 15 may perform a collation process using a method other than that illustrated above as an example. Moreover, the function as the collation means 15 may be held by the control means 12, for example. That is, the object identifying device 10 may have one information processing device having a function as the control means 12 and a function as the collation means 15, instead of the control means 12 and the collation means 15.

The exemplary configuration of the image capturing system 1 is as described above. In the present embodiment, a specific configuration of the object 2 is not particularly limited.

Figure 3:
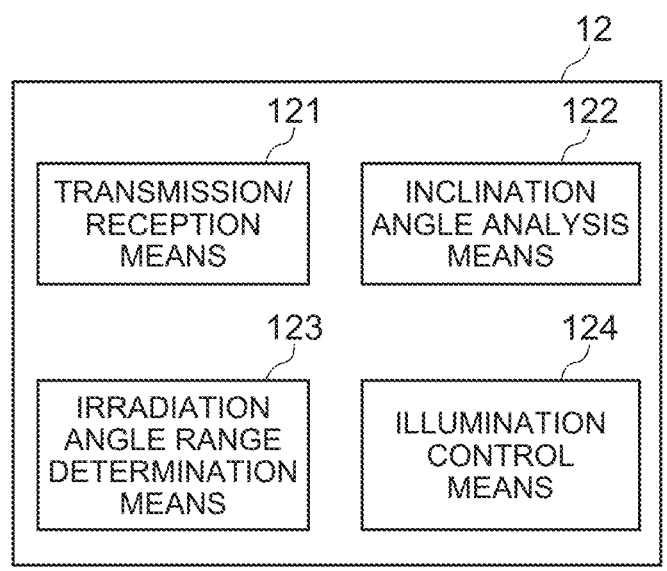
FIG. 3 is a block diagram illustrating an exemplary configuration of the control means illustrated in FIG. 1.

FIG. 3 illustrates exemplary function blocks of the control means 12 in the present embodiment. Referring to FIG. 3, the control means 12 includes a transmission/reception means 121, an inclination angle analysis means 122, an irradiation angle range determination means 123, and an illumination control means 124. Note that the control means 12 may include, for example, a storage device and an arithmetic unit such as a central processing unit (CPU) not illustrated. The control means 12 implements the respective processing means described above by the execution of a program stored in the storage device by the arithmetic unit.

The transmission/reception means 121 transmits and receives information to and from the measurement means 11 and the illumination means 13. The transmission/reception means 121 receives unevenness measurement data that is a measurement result of unevenness on a surface of the object 2, from the measurement means 11.

The inclination angle analysis means 122 calculates a statistic value of the inclination angle having a large individual difference on the surface of the object, on the basis of unevenness measurement data that is a measurement result of the unevenness on the surface of the object 2 by the measurement means 11. In other words, the inclination angle analysis means 122 analyzes the unevenness measurement data to thereby calculate a statistic value of the inclination angle having a large individual difference that is a value corresponding to the fine unevenness existing on the surface of the object 2. For example, the inclination angle analysis means 122 may calculate a statistic value α of the inclination angle that is the largest inclination angle in the dispersion, from a plurality of pieces of individuals of the unevenness measurement data. In other words, the inclination angle analysis means 122 calculates, as a, a statistic value of the inclination angle of unevenness in which variations of the inclination angles are relatively larger than those of other pieces of unevenness, in the pieces of unevenness commonly existing on the surfaces of a plurality of individuals of the object. Here, the statistic value may be an average value. Alternatively, the statistic value may be a mean value of a mode value.

The irradiation angle range determination means 123 determines the irradiation angle range when the illumination means 13 irradiates the object 2, on the basis of the statistic value α of the inclination angle calculated by the inclination angle analysis means 122. For example, the irradiation angle range determination means 123 calculates a value of a plane half angle θ (see FIG. 1) of the irradiation solid angle with the vertical direction of the object 2 being the center, on the basis of the statistic value a of the inclination angle. Note that the plane half angle θ of the irradiation solid angle shows an inclination angle (zenith angle) from the optical axis O, as illustrated in FIG. 1.

The irradiation angle range determination means 123 determines the irradiation angle range by calculating the plane half angle θ of the irradiation solid angle from the statistic value α of the inclination angle, on the basis of the following expression:

$$\theta = 2 \times \alpha \quad (1)$$

As described above, for example, the irradiation angle range determination means 123 calculates the plane half angle θ of the irradiation solid angle by obtaining a value that is twice as large as the statistic value α of the inclination angle that is a calculation result by the inclination angle analysis means 122, to thereby determine the irradiation angle range.

Here, the grounds for performing the above-described process will be described with reference to FIGS. 4 and 5.

Figure 4:
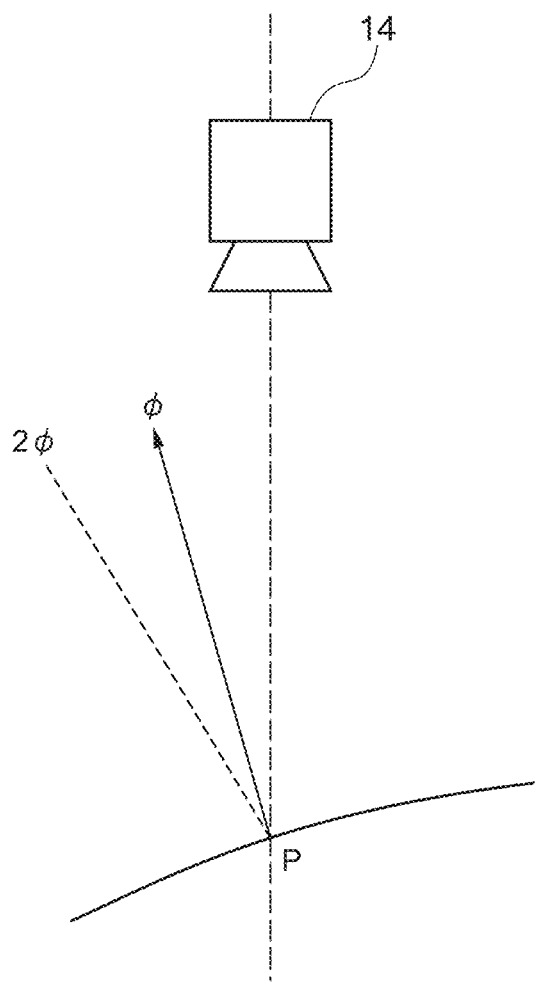
FIG. 4 is a schematic diagram illustrating a relationship among the inclination angle of unevenness on an object surface, the irradiation angle, and light and dark.

FIG. 4 is a schematic diagram illustrating a relationship among the inclination angle of unevenness on the surface of the object 2, the irradiation angle, and light and dark. In FIG. 4, an angle φ is an inclination angle from the optical axis O of the normal line stood at a point P on the surface of the object. When the illumination means 13 exists in a linearly symmetrical direction (zenith angle θ=2φ) with the optical axis O with respect to the normal line, the direct light reflected at the point P enters the capturing means 14. On the other hand, when the illumination means 13 does not exist in the direction of zenith angle θ=2φ, there is no direct light that reflects at the point P and enters the capturing means 14. As described above, whether or not the direct light enters the capturing means 14 is determined depending on the relationship between the inclination angle on the surface of the object 2 and the irradiation angle with respect to the object 2 by the illumination means 13. In other words, by the capturing means 14, a light-dark pattern reflecting the inclination angle at each point of the surface unevenness of the object 2 is captured.

Figure 5:
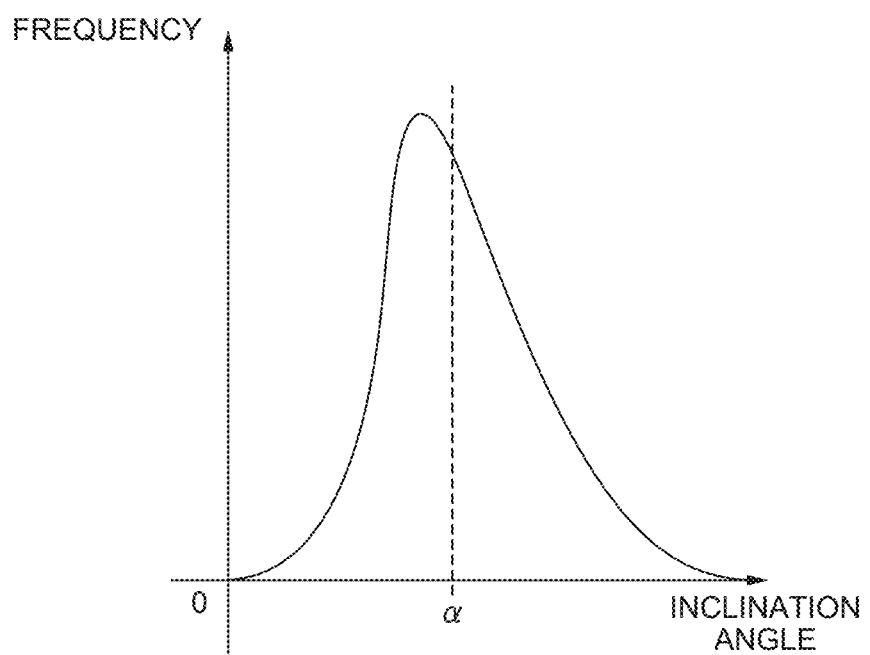
FIG. 5 illustrates an example of distribution of inclination angles of an unevenness group and a statistic value of inclination angles.

FIG. 5 illustrates, on a definition that a group of pieces of unevenness existing T the same position on the surfaces of a plurality of individuals of the object 2 is an unevenness group, an example of distribution of inclination angles of an unevenness group in which variations of the inclination angles of the pieces of unevenness in the individuals, among a plurality of unevenness groups, is larger than those of other unevenness groups (hereinafter referred to as a target unevenness group, and the unevenness included in the target unevenness group is refereed to as target unevenness) and the statistic value α of the inclination angle. Referring to FIG. 5, the inclination angle α substantially halves the distribution of the inclination angles of the target unevenness. That is, the inclination statistic value α is a value that substantially halves a plurality of pieces of target unevenness existing at the same position on the surfaces of a plurality of individuals of the object 2 into pieces of unevenness in which the inclination angle φ from the optical axis O is smaller than α (φ<α) and pieces of unevenness in which the inclination angle φ is larger than α (φ>α). Therefore, when the plain half angle θ with the optical axis O being the center satisfies θ=2α, in the individual having the target unevenness in which φ is smaller than α (φ<α), the direct light that is emitted from the illumination means 13 and reflected at the unevenness enters the capturing means 14, so that the light-dark pattern of the target unevenness is a light pattern. On the other hand, in the individual having the target unevenness in which φ is larger than α (φ>α), the direct light that is emitted from the illumination means 13 and reflected at the target unevenness does not enter the capturing means 14, so that the light-dark pattern of the target unevenness is a dark pattern. That is, in an almost half of the plurality of individuals of the object 2, the light-dark pattern of the target unevenness is a light pattern, and in the remaining half of the individuals, the light-dark pattern of the target unevenness is a dark pattern. In this way, the probabilities of generation of the light pattern and the dark pattern of the pieces of unevenness existing at the same locations of the individuals of the object 2 can be equalized, whereby the individual discrimination capacity is improved.

As described above, for example, the irradiation angle range determination means 123 obtains, for example, a value that is twice as large as the statistic value α of the inclination angle that is a calculation result by the inclination angle analysis means 122, to thereby determine the irradiation angle range.

The illumination control means 124 controls the illumination means 13 and the like such that the plane half angle θ of the irradiation solid angle when the illumination means 13 irradiates the object 2 with light becomes almost 2α. The illumination control means 124 controls the distance between the illumination means 13 and the object 2 and the shielding range by the shielding means 131 such as a diaphragm formed in the illumination means 13, to thereby allow the plane half angle θ of the irradiation solid angle to become 2α. In other words, the illumination control means 124 controls the distance between the illumination means 13 and the object 2 and the shielding range by the shielding means 131 formed in the illumination means 13 so as to allow the direct light to enter the object 2 by the illumination means 13 from a range in which the plane half angle θ of the irradiation solid angle is between 0 degrees to 2α degrees. Note that the illumination control means 124 may control the plane half angle θ of the irradiation solid angle by using a method other than that illustrated above.

Figure 6A:
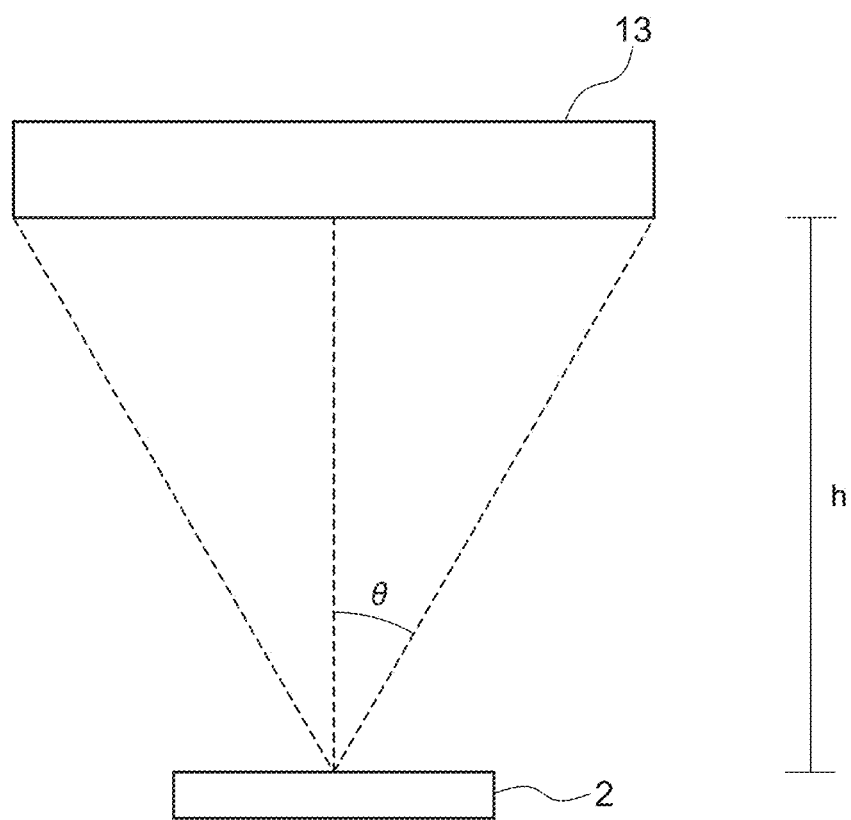
FIG. 6A illustrates an exemplary relationship between a distance between an illumination means and an object and an irradiation solid angle.
Figure 6B:
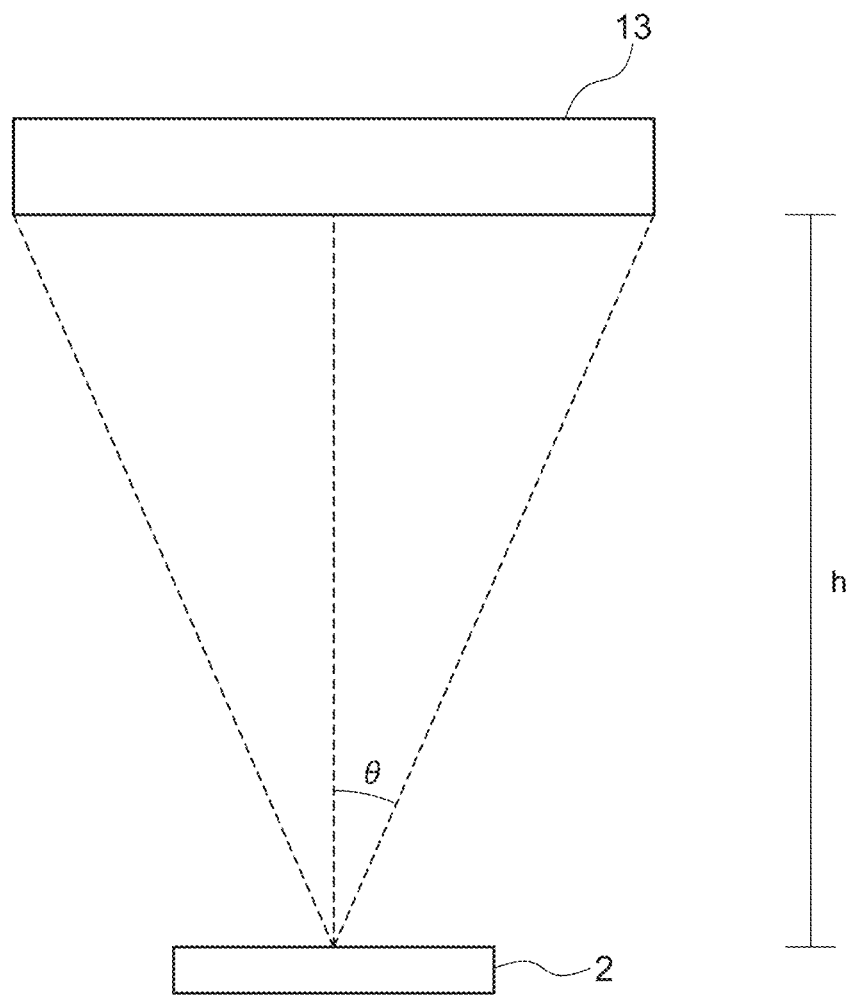
FIG. 6B illustrates another exemplary relationship between a distance between an illumination means and an object and an irradiation solid angle.

FIGS. 6A and 6B illustrate examples of a relationship between a distance h between the illumination means 13 and the object 2 and the plane half angle θ of the irradiation solid angle. Specifically, FIG. 6A illustrates an example of the plane half angle θ of the irradiation solid angle when the distance h between the illumination means 13 and the object 2 takes a given value, and FIG. 6B illustrates an example of the plane half angle θ when the distance h between the illumination means 13 and the object 2 is longer than the given value illustrated in FIG. 6A. Referring to FIGS. 6A and 6B, it is found that as the distance h between the illumination means 13 and the object 2 is shorter, the value of the plane half angle θ of the irradiation solid angle is larger, and as the distance h between the illumination means 13 and the object 2 is longer, the value of the plane half angle θ of the irradiation solid angle is smaller. As described above, by controlling the distance between the illumination means 13 and the object 2, the value of the plane half angle θ of the irradiation solid angle can be controlled.

Figure 7A:
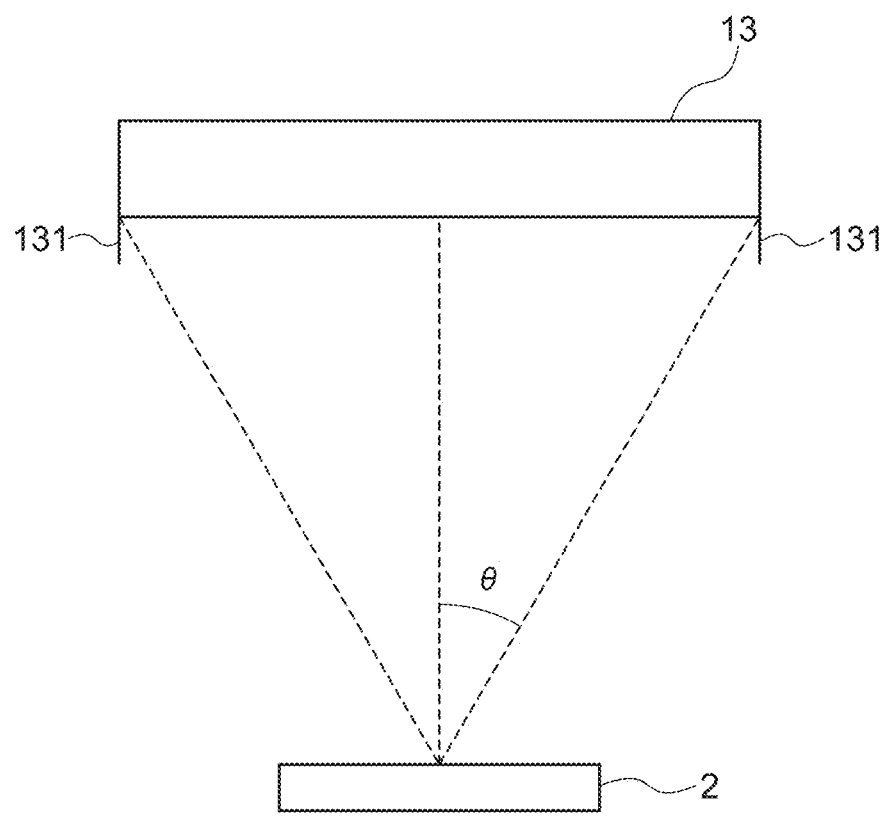
FIG. 7A illustrates an example of an irradiation solid angle when a shielding means is provided to the illumination means.
Figure 7B:
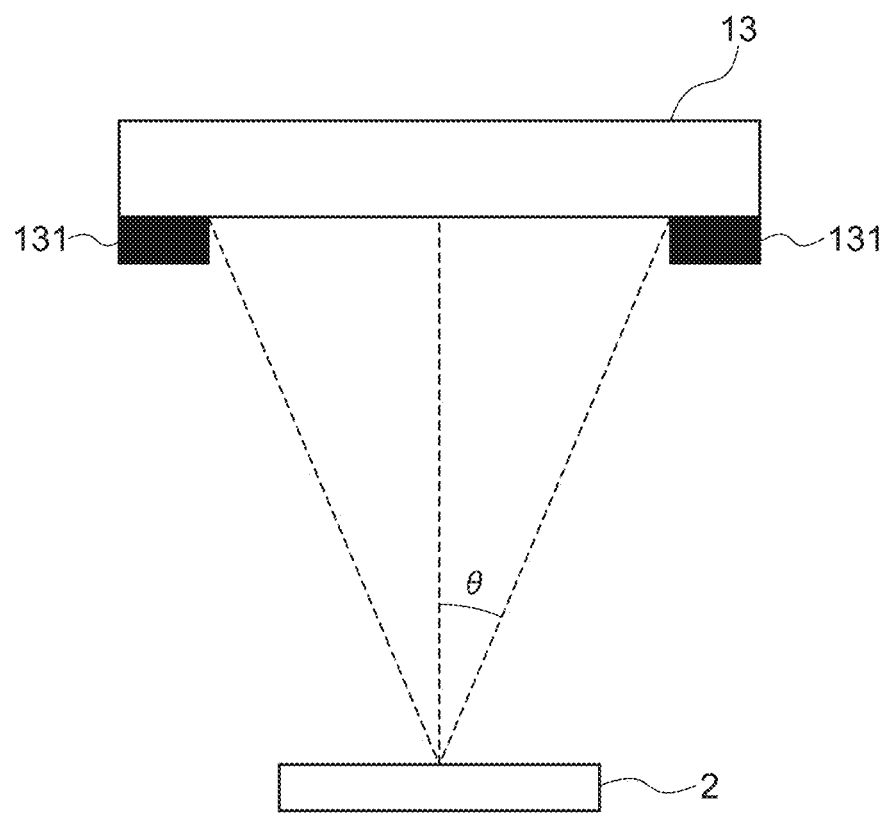
FIG. 7B illustrates another example of an irradiation solid angle when a shielding means is provided to the illumination means.

FIGS. 7A and 7B illustrate examples of the irradiation solid angle when the shielding means 131 is provided to the illumination means 13. Specifically, FIG. 7A illustrates an example of the irradiation solid angle when the shielding means 131 is provided to the illumination means 13, and FIG. 7B illustrates an example of the irradiation solid angle when a larger range is shielded by using the shielding means 131 (for example, narrowing the diaphragm) compared with FIG. 7A. Referring to FIGS. 7A and 7B, it is found that the value of the plane half angle θ is decreased when the shielded range by the shielding means 131 is increased by the act of narrowing the diaphragm or the like. As described above, even by the method of controlling the shielding means 131, the value of the plane half angle θ of the irradiation solid angle can also be controlled.

The illumination control means 124 controls the plane half angle θ of the irradiation solid angle by using any of the aforementioned means, a combination of the aforementioned means, a well-known means other than those described above, or a combination thereof.

Figure 8:
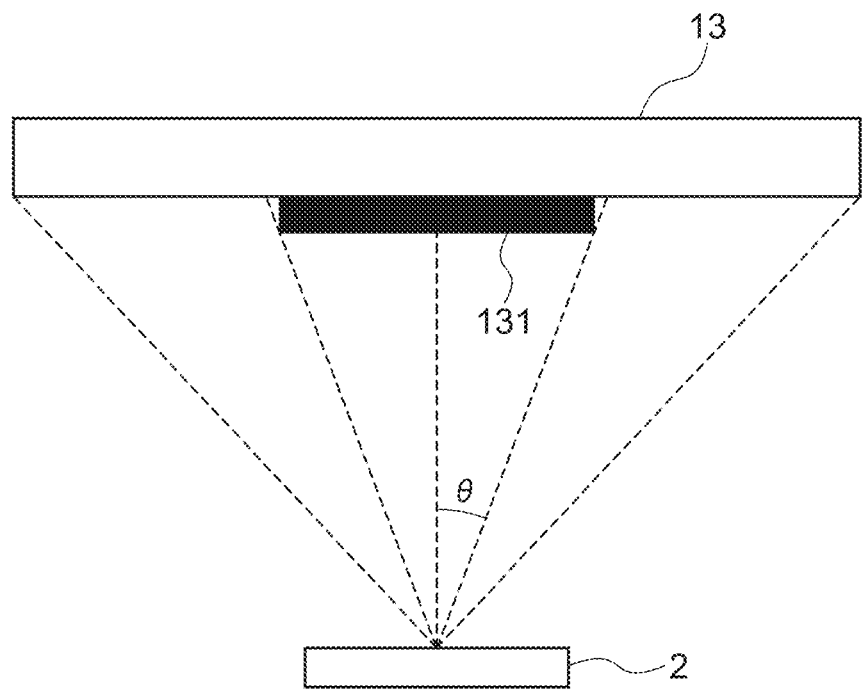
FIG. 8 illustrates another example of a relationship between the shielding means and an irradiation angle.

Note that as illustrated in FIG. 8 for example, the illumination control means 124 may control the illumination means 13 such that a range in which the plane half angle θ is 0 to 2α becomes dark and a range in which the plane half angle θ is 2α degrees or larger (90 degrees or smaller at maximum) becomes light. In other words, the irradiation angle range determination means 123 may be configured to determine the irradiation angle range by calculating the angle range in which the direct light does not enter the object 2 by the illumination means 13. The control by the illumination control means 124 as described above is adopted in the case of using a dome-type lighting or a ring-type lighting as the illumination means 13. In the case of performing such control, as similar to the cases illustrated in FIGS. 6A and 6B and FIGS. 7A and 7B, by controlling the distance between the illumination means 13 and the object 2 and the shielding range by the shielding means 131. In the case of controlling the illumination means 13 such that the range in which the plane half angle θ is 2α degrees or larger (90 degrees or smaller at maximum) becomes light, it is not necessary that the illumination control means 124 controls the illumination means 13 until the upper limit of the range to be light becomes 90 degrees. This is because an area where the inclination angle is extremely separated from 2α has less frequency and the image pattern is not changed significantly by the light and dark of such area, therefore an image pattern can be captured without any problems. A value that is an upper limit in the case of controlling the illumination means 13 such that the range in which the plane half angle θ is 2α degrees or larger (90 degrees or smaller at maximum) becomes light may be set to be 70 degrees or 80 degrees in advance, or may be configured to be calculated according to the unevenness measurement data or the like.

The exemplary configuration of the control means 12 is as described above. Note that the configuration of the control means 12 is not limited to that described above.

For example, the function as the inclination angle analysis means 122 held by the control means 12 may be held by the measurement means 11. That is, the control means 12 may be configured to receive a statistic value of the inclination angle calculated by the measurement means 11. In that case, the control means 12 may not have the inclination angle analysis means 122.

Moreover, the function as the illumination control means 124 held by the control means 12 may be held by the illumination means 13. That is, the control means 12 may be configured to transmit the irradiation angle range determined by the irradiation angle range determination means 123 to the illumination means 13. In that case, the control means 12 may not have the illumination control means 124.

Note that the control means 12 may be configured to transmit the irradiation angle range determined by the irradiation angle range determination means 123 to a screen display unit such as a liquid crystal display (LCD) not illustrated or an external information processing device. In that case, control of the illumination means 13 may be performed manually by an operator or the like, for example.

As described above, the control means 12 may be configured to determine an irradiation angle range with respect to the object 2 by the illumination means 13 on the basis of the statistic value of the inclination angle received from the measurement means 11, and transmit the determined irradiation angle range to the illumination means 13.

Next, an exemplary operation of the image capturing system 1 will be described with reference to FIG. 9.

Figure 9:
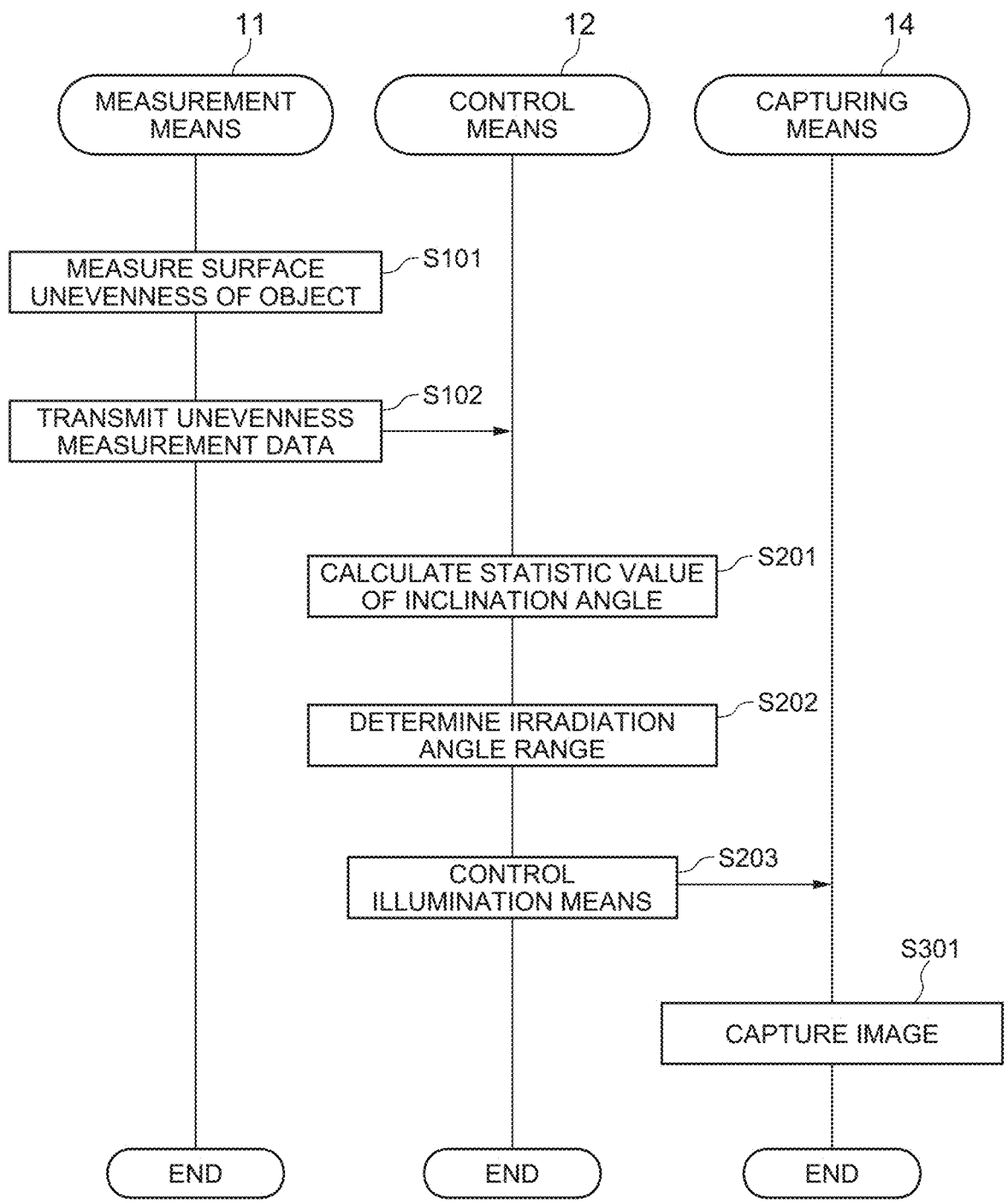
FIG. 9 is a sequence chart illustrating an exemplary operation of an image capturing system.

Referring to FIG. 9, the measurement means 11 measures the unevenness on a surface of the object 2 and acquires unevenness measurement data (step S101). The measurement means 11 transmits the acquired unevenness measurement data to the control means 12 (step S102). Steps S101 and S102 are repeatedly performed with respect to each of the individuals of the object 2, for example. The individuals of an object are, for example, parts manufactured by being molded using the same mold. However, the manufacturing method is not limited to molding, and any other manufacturing method such as cutting may be used. For measurement, a jig or the like is used, and pieces of unevenness at almost the same positions are measured. That is, shape data of unevenness on the same area on each surface of a plurality of individuals of the object 2 is measured. The shape data is measured at equal intervals on the XY plane. That is, the area is divided into M1 pieces in the X axis direction, and divided into N1 pieces in the Y axis direction, and for each of the M1×N1 pieces of elements, the height in the Z axis direction is measured. The M1×N1 pieces of elements are described as an element (1, 1), . . . , an element (M1, N1). Further, measurement data of unevenness measured from element (i, j) (1≤i≤M1, 1≤j≤N1) is described as shape data Z(i, j). Accordingly, from each of the individuals of the object 2, pieces of shape data Z(1, 1), . . . , Z(M1, N1) are obtained.

The inclination angle analysis means 122 of the control means 12 calculates the statistic value α of the inclination angle from the pieces of shape data of a plurality of individuals of the object 2 (step S201). The details of step S201 will be described in detail later.

The irradiation angle range determination means 123 determines the plane half angle θ of the irradiation solid angle on the basis of the statistic value α of the inclination angle calculated by the inclination angle analysis means 122, to thereby determine the irradiation angle range having high individual discriminability (step S202). For example, the irradiation angle range determination means 123 calculates the value that is almost twice as large as the inclination angle α as the plane half angle θ of the irradiation solid angle. The illumination control means 124 controls the illumination means 13 on the basis of the irradiation angle range determined by the irradiation angle range determination means 123 (step S203). For example, the illumination control means 124 controls the distance between the illumination means 13 and the object 2 and the shielding range by the shielding means 131 formed in the illumination means 13 so as to allow the direct light to enter the object 2 by the illumination means 13 from a range in which the plane half angle θ of the irradiation solid angle is between 0 degrees to 2α degrees. The illumination control means 124 can also be configured to notify the capturing means 14 of the fact that illumination control has been completed. Notification to the capturing means 14 may be performed by the illumination means 13.

After completion of control by the illumination control means 124, at the timing of irradiating the object 2 by the illumination means 13, the capturing means 14 captures an image (step S301). Note that capturing of an image by the capturing means 14 may be performed manually.

Figure 10:
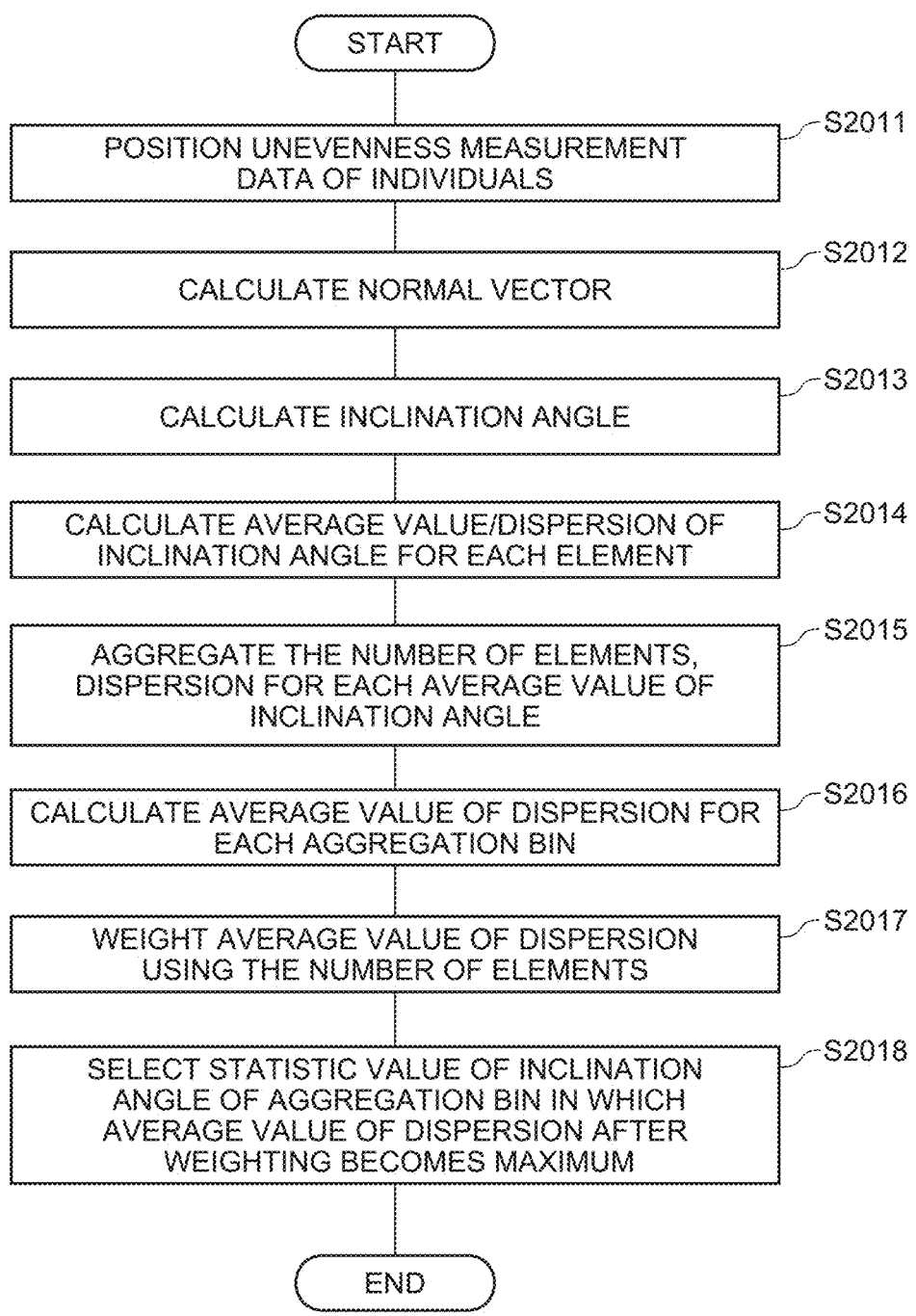
FIG. 10 is a flowchart showing an exemplary operation of an inclination angle analysis means.

FIG. 10 is a flowchart illustrating an exemplary operation (step S201) of calculating, by the inclination angle analysis means 122, the statistic value α of the inclination angle from the pieces of shape data of a plurality of individuals of the object 2 (step S201). Referring to FIG. 10, the inclination angle analysis means 122 performs positioning of the shape data in the unevenness measurement data of a plurality of individuals (step S2011). In this step, two processes, that is, a positioning process and a common element extraction process, are performed sequentially. This will be described using FIG. 11.

Figure 11:
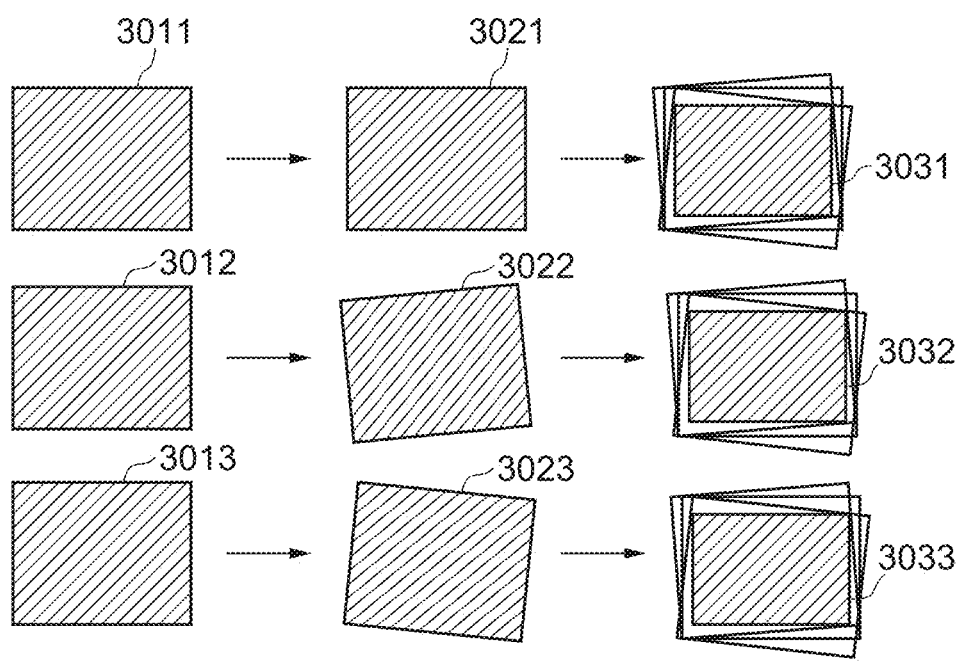
FIG. 11 illustrates a positioning process and a common element extraction process.

In the positioning process, the inclination angle analysis means 122 uses, for example, Lucas-Kanade method to estimate a rigid transformation including translation and rotation. Any other methods that are generally used for image positioning or the like may be used, of course. Referring to FIG. 11, in the positioning process, with reference to shape data 3011 of an individual, rigid transformation is performed on pieces of shape data 3012 and 3013 of all remaining individuals to obtain pieces of shape data 3021, 3022, and 3023 after the transformation. Note that since the shape data 3021 is data of the individual used as a reference for positioning, it is identical to the shape data 3011.

In the common element extraction process, the inclination angle analysis means 122 eliminates elements of the edge portion in which only part of individuals has values from the shape data after the positioning, and extracts a common element in which all of the individuals have values. Referring to FIG. 11 again, among the M1×N1 pieces of elements of the shape data 3021, 3022, and 3023, M2×N2 pieces of elements that all of the individuals commonly have values are extracted from the respective pieces of shape data 3021, 3022, and 3023. The shape data of the M2×N2 pieces of elements extracted from the shape data 3021, 3022, and 3023 are shape data 3031, 3032, and 3033. The shape data 3031, 3032, and 3033 of the M2×N2 pieces of elements obtained from the respective individuals are described as shape data Z(1, 1), . . . , Z(M2, N2). Here, shape data Z(i, j) of one individual corresponding to shape data Z(i, j) of another individual. In other words, the shape data Z(i, j) of one individual and the shape data Z(i, j) of the other individual have the same XY coordinate values. The shape data Z having the same XY coordinates exists in the number that is the same as the number of the individuals. A set of shape data Z having the same XY coordinate values is, in other words, an unevenness group that is a group of pieces of unevenness existing at the same position on the surfaces of the individuals of the object 2.

Then, the inclination angle analysis means 122 calculates, for each individual and each element, a normal vector of the element from the shape data Z(i, j) of the element (step S2012).

Figure 12:
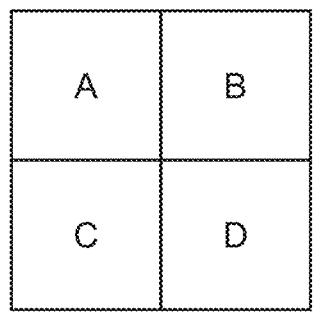
FIG. 12 illustrates a method of calculating a normal vector.

FIG. 12 illustrates a method of calculating a normal vector. FIG. 12 illustrates 2×2 pieces, that is four pieces in total, of elements A, B, C, and D. Here, assuming that the shape data measured from the elements A, B, and C are $Z_A$, $Z_B$, and $Z_C$, a normal vector $n_A$ of the unevenness of the element A is calculated as the outer product of a vector $Z_A Z_B$ and a vector $Z_A Z_C$, as shown by the following expression:

$$n_A = Z_A Z_B \times Z_A Z_C \qquad (2)$$

Then, the inclination angle analysis means 122 calculates, for each individual and each element, the inclination angle of the normal vector of the element (step S2013). The inclination angle θ of the normal vector $n_A$ of the element is calculated from the X, Y, and Z components $n_x$, $n_y$, and $n_z$ of the normal vector $n_A$ thereof.

$$\theta = \arctan\{(n_x^2 + n_y^2)^{1/2} / n_z\} \qquad (3)$$

Then, the inclination angle analysis means 122 calculates, for each element, an average value and dispersion of the inclination angles of the normal vectors of the same element of all individuals (step S2014).

Figure 13:
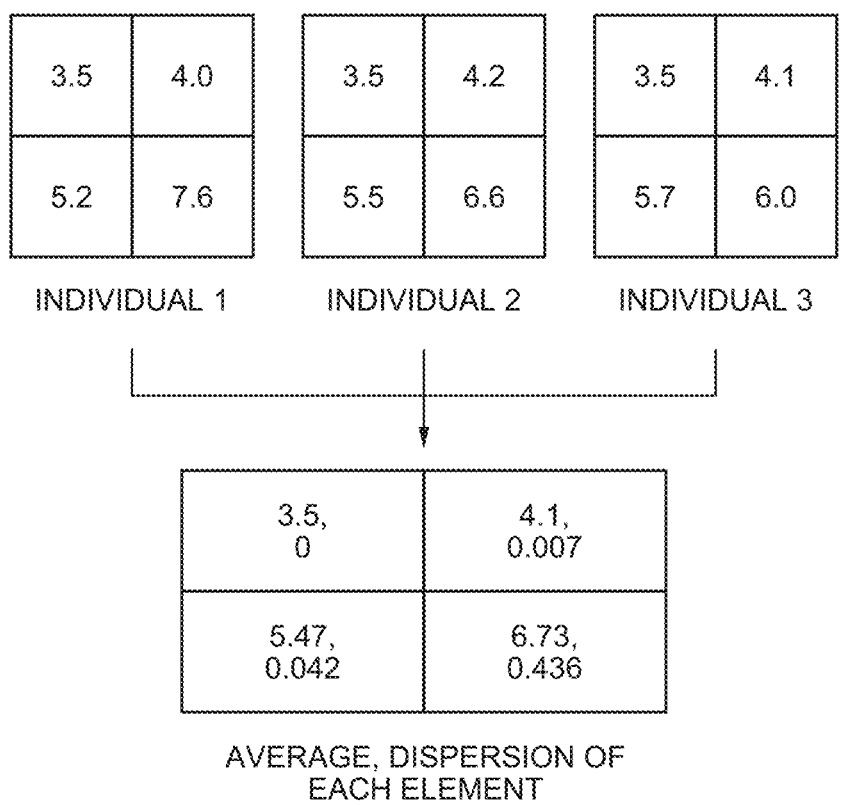
FIG. 13 illustrates an example of calculating an average value and dispersion of inclination angles of a normal vector.

FIG. 13 illustrates an example of calculating an average value and dispersion of inclination angles of normal vectors. In the example of FIG. 13, the number of individuals of a component 3 is three, namely an individual 1, an individual 2, and an individual 3, and the number of elements is four, namely an upper left element, an upper right element, a lower left element, and a lower right element. For example, in the individual 1, the inclination angle of the upper right element is 4.0, in the individual 2, it is 4.2, and in the individual 3, it is 4.1. Therefore, it is calculated that the average value of the inclination angles of the upper right elements is 4.1, and the dispersion is 0.007.

Then, the inclination angle analysis means 122 aggregates, for each value of the average value of the inclination angles of the normal vectors, the number of elements and dispersion (step S2015). The bin range of aggregation may be almost the same level as the accuracy of adjustment in the illumination angle range. For example, when the minimum adjustment range of the irradiation angle by the illumination means 13 is 1°, the bin range of aggregation may be taken at 1° intervals. In that case, for example, one aggregation bin corresponds to those having an inclination angle average value that is 10° or larger but smaller than 11°, and another aggregation bin corresponds to those having an inclination angle average value that is 11° or larger but smaller than 12°.

Then, the inclination angle analysis means 122 calculates an average value of the dispersion for each aggregation bin (step S2016). The inclination angles aggregated to a bin having a large average value of dispersion involve large individual differences. That is, the inclination angles aggregated to the bin having a large average value of dispersion are inclination angles having high individual discriminability.

Then, for each aggregation bin, the inclination angle analysis means 122 applies a weight by multiplying the average value of dispersion by the number of elements classified to the aggregation bin (step S2017). As the number of elements classified to the aggregation bin is larger, the number of normal vectors captured as the boundary of light-dark pattern of a captured image is larger. Therefore, it is suitable for individual identification. By the weighting, the inclination angle having a larger number of elements is likely to be calculated as an inclination angle having high individual discriminability. Also, it is possible to prevent an inclination angle in which the number of normal vectors captured as the boundary of light-dark pattern is extremely small from being calculated as an inclination angle having high individual discriminability.

Finally, the inclination angle analysis means 122 calculates an inclination angle corresponding to an aggregation bin in which the weighted average value of dispersion becomes maximum as the statistic value $\alpha$ of the inclination angle (step S2018). For example, when the aggregation bin in which the weighted average value of dispersion becomes maximum is an aggregation bin corresponding to an inclination angle average value that is 10° or larger but smaller than 11°, an inclination angle 10° or 11° or a mean value thereof, that is, 10.5°, is calculated as the statistic value $\alpha$ of the inclination angle.

The exemplary operation of the image capturing system 1 is as described above. As described above, the process of step S201 may be performed by the measurement means 11. Further, the process of step S203 may be performed by the illumination means 13. Furthermore, the weighting process at step S2017 is not mandatory, and may be omitted. That is, the inclination angle analysis means 122 may calculate an inclination angle corresponding to an aggregation bin in which an average value of dispersion before being weighted becomes maximum as the statistic value $\alpha$ of an inclination angle.

As described above, the image capturing system 1 of the present embodiment includes the measurement means 11 and the control means 12. Further, the control means 12 includes the inclination angle analysis means 122 and the irradiation angle range determination means 123. With this configuration, the inclination angle analysis means 122 can calculate the statistic value $\alpha$ of an inclination angle of an unevenness group in which variations of inclination angles are relatively larger than those of other unevenness groups, among the unevenness groups each of which is a group of a plurality of pieces of unevenness existing at the same position on the surfaces of individuals of the object 2, on the basis of the measurement result by the measurement means 11. Moreover, the irradiation angle range determination means 123 can determine the irradiation angle when the illumination means 13 irradiates the object 2, on the basis of the statistic value $\alpha$ of the inclination angle calculated by the inclination angle analysis means 122. As described above, when the object 2 is captured by the capturing means 14 in a state where the illumination means 13 irradiates the object 2 from the irradiation angle determined by the irradiation angle range determination means 123, an image having high individual discriminability can be acquired. That is, with the configuration described above, it is possible to easily acquire an image having high individual discriminability.

Figure 14A:
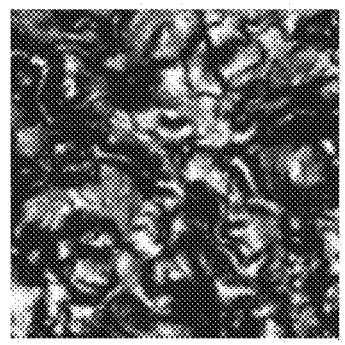
FIG. 14A illustrates an example of a captured image.
Figure 14B:
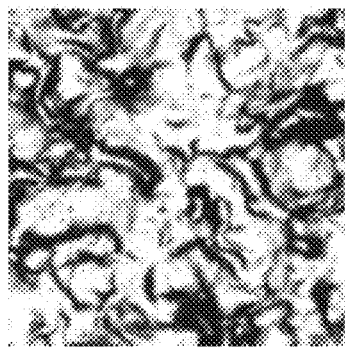
FIG. 14B illustrates another example of a captured image.
Figure 15:
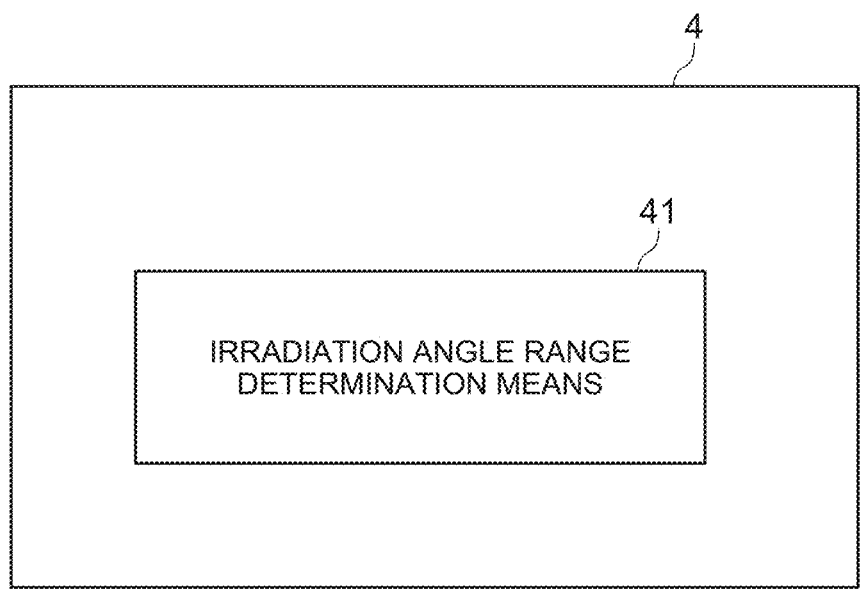
FIG. 15 is an exemplary configuration of an information processing device according to a second exemplary embodiment of the present invention.

FIG. 14A and FIG. 14B illustrate examples of captured images of a surface of the actual object 2, captured using the image capturing system 1. FIG. 14A illustrates an example of a captured image when $\theta=5°$, and FIG. 14B illustrates an example of a captured image when $\theta=10°$. Referring to FIGS. 14A and 14B, in the captured images in the cases of $\theta=5°$ and $\theta=10°$, it is found that normal vectors of different inclination angles are extracted as boundary lines between light and dark. From the captured images of FIGS. 14A and 14B, it cannot be determined which is an angle having high individual discriminability at a glance. However, according to the present invention, by controlling the illumination means 13 to realize the plane half angle $\theta=$almost $2\alpha$ on the basis of the statistic value $\alpha$ of the inclination angle having high individual discriminability calculated by the control means 12, it is possible to acquire an image having high individual discriminability by the capturing means 14.

Second Exemplary Embodiment

Next, an image capturing device according to a second exemplary embodiment of the present invention will be described. The image capturing device 4 according to the present embodiment is an image capturing device configured to illuminate an object by an illumination means and capture reflected light from the object as a reflection image by a capturing means. The image capturing device 4 includes an irradiation angle range determination means 41.

The irradiation angle range determination means 41 is configured to, assuming that a group of pieces of unevenness existing at the same position on the surfaces of a plurality of individuals of an object is an unevenness group, determine the irradiation angle range for irradiating the object by the illumination means on the basis of a statistic value of the inclination angles of the unevenness group in which variations in the inclination angles of the unevenness between individuals is larger that other unevenness groups, among the plurality of unevenness groups. The irradiation angle range determination means 41 may be configured similarly to the irradiation angle range determination means 123 of FIG. 3 for example, but is not limited thereto.

The image capturing device 4 configured as described above operates as described below. That is, the irradiation angle range determination means 123 determines the irradiation angle range for irradiating the object by the illumination means on the basis of a statistic value of the inclination angles of the unevenness group in which variations in the inclination angles of the unevenness between individuals is larger than those of the other unevenness groups, among the plurality of unevenness groups.

The image capturing device 4 according to the present embodiment is configured and operates as described above. Therefore, it is possible to capture an image of an object under an illumination environment that is appropriate for individual identification and collation of the object. This is because the irradiation angle range determination means 123 determines the irradiation angle range for irradiating the object by the illumination means, on the basis of a statistic value of the inclination angles of the unevenness group in which variations in the inclination angles of the unevenness between individuals is larger than those of the other unevenness groups, among the plurality of unevenness groups.

While the present invention has been described with reference to the exemplary embodiment described above, the present invention is not limited to the above-described embodiment. The form and details of the present invention can be changed within the scope of the present invention in various manners that can be understood by those skilled in the art.

The whole or part of the exemplary embodiments disclosed above can be described as, but not limited to, the following supplementary notes.

(Supplementary Note 1)

An image capturing device configured to illuminate an object by illumination means and capture reflected light from the object as a reflection image by capturing means, the device comprising irradiation angle range determination means for, assuming that a group of pieces of unevenness existing at a same position on surfaces of a plurality of individuals of an object is an unevenness group, determining an irradiation angle range for irradiating the object by the illumination means, on a basis of a statistic value of inclination angles of an unevenness group in which variations in the inclination angles of the unevenness between the individuals is larger than a statistic value of another unevenness group, among a plurality of the unevenness groups.

(Supplementary Note 2)

The image capturing device according to supplementary note 1, further comprising inclination angle analysis means for calculating a statistic value of the inclination angles on a basis of a measurement result of the unevenness existing on the surfaces of the plurality of individuals, wherein the irradiation angle range determination means is configured to determine the irradiation angle range on a basis of the statistic value of the inclination angles calculated by the inclination angle analysis means.

(Supplementary Note 3)

The image capturing device according to supplementary note 2, wherein the inclination angle analysis means is configured to:

generate the plurality of unevenness groups from the measurement result of the unevenness;

for each of the unevenness groups, calculate a statistic value and dispersion of the inclination angles of a plurality of pieces of unevenness included in the unevenness group;

for each bin defined by sectioning the statistic values of the inclination angles for each predetermined range, aggregate the dispersion calculated for the unevenness group in which the statistic value of the inclination angles falls within a range of the bin;

for each bin, calculate a dispersion average that is an average value of the dispersion aggregated; and select a statistic value of the inclination angles in a range of the bin in which the dispersion average becomes maximum.

(Supplementary Note 4)

The image capturing device according to supplementary note 3, wherein the inclination angle analysis means is configured to:

calculate a weighted dispersion average that is obtained by applying a weight to the dispersion average with use of a number of the unevenness groups aggregated to the bin; and select a statistic value of the inclination angles in a range of the bin in which the weighted dispersion average becomes maximum.

(Supplementary Note 5)

An image capturing method for illuminating an object by illumination means and capturing reflected light from the object as a reflection image by capturing means, the method comprising assuming that a group of pieces of unevenness existing at a same position on surfaces of a plurality of individuals of an object is an unevenness group, determining an irradiation angle range for irradiating the object by the illumination means, on a basis of a statistic value of inclination angles of an unevenness group in which variations in the inclination angles of the unevenness between individuals is larger than a statistic value of another unevenness group, among a plurality of unevenness groups.

(Supplementary Note 6)

The image capturing method according to supplementary note 5, further comprising calculating a statistic value of the inclination angles on a basis of a measurement result of the unevenness existing on the surfaces of the plurality of individuals, wherein the determining the irradiation angle range includes determining the irradiation angle range on a basis of the statistic value of the inclination angles calculated.

(Supplementary Note 7)

The image capturing method according to supplementary note 6, wherein the calculating the statistic value of the inclination angles includes:

generating the plurality of unevenness groups from the measurement result of the unevenness;

for each of the unevenness groups, calculating a statistic value and dispersion of inclination angles of a plurality of pieces of unevenness included in the unevenness group;

for each bin defined by sectioning the statistic values of the inclination angles for each predetermined range, aggregating the dispersion calculated for the unevenness group in which the statistic value of the inclination angles falls within a range of the bin;

for each bin, calculating a dispersion average that is an average value of the dispersion aggregated; and selecting a statistic value of the inclination angles in a range of the bin in which the dispersion average becomes maximum.

(Supplementary Note 8)

The image capturing method according to supplementary note 7, wherein the selecting the statistic value of the inclination angles includes:

calculating a weighted dispersion average that is obtained by applying a weight to the dispersion average with use of a number of the unevenness groups aggregated to the bin; and selecting a statistic value of the inclination angles in a range of the bin in which the dispersion average becomes maximum.

(Supplementary Note 9)

A computer-readable storage medium storing a program for causing a computer to perform processing of, the computer constituting an image capturing device configured to illuminate an object by illumination means and capture reflected light from the object as a reflection image by capturing means:
assuming that a group of pieces of unevenness existing at a same position on surfaces of a plurality of individuals of an object is an unevenness group, determining an irradiation angle range for irradiating the object by the illumination means, on a basis of a statistic value of inclination angles of an unevenness group in which variations in the inclination angles of the unevenness between the individuals is larger than a statistic value of another unevenness group, among a plurality of the unevenness groups.

REFERENCE SIGNS LIST 1 image capturing system
10 object identifying device
11 measurement means
12 control means
121 transmission/reception means
122 inclination angle analysis means
123 irradiation angle range determination means
124 illumination control means
13 illumination means
131 shielding means
14 capturing means
15 collation means
2 object
4 image capturing device
41 irradiation angle range determination means

What is claimed is:

1. An image capturing device configured to irradiate an object and capture reflected light from the object as a reflection image, the image capturing device comprising:
a memory containing program instructions; and
a processor coupled to the memory, wherein the processor is configured to execute the program instructions to:
determine an irradiation angle range for irradiating the object based on a statistical value of inclination angles of unevenness of an unevenness group in which variation in the inclination angles of the unevenness is larger than a statistical value of another unevenness group, among a plurality of unevenness groups,
wherein each of the plurality of unevenness groups includes a group of pieces of the unevenness existing at a same position on a surface of a plurality of individuals of the object.

2. The image capturing device according to claim 1, wherein the processor is further configured to:
calculate the statistical value of the inclination angles of the unevenness based on a measurement result of the unevenness existing on the surface of the plurality of individuals, and
the processor is configured to determine the irradiation angle range by determining the irradiation angle range based on the statistical value of the inclination angles of the unevenness as has been calculated.

3. The image capturing device according to claim 2, wherein the processor is configured to calculate the statistical value of the inclination angles of the unevenness by:
generating the plurality of unevenness groups from the measurement result of the unevenness;
for each unevenness group of the plurality of unevenness groups, calculating the statistical value and a dispersion of the inclination angles of the unevenness of the group of pieces of the unevenness included in the each unevenness group;
for each bin of a plurality of bins defined by sectioning the statistical values of the inclination angles of the unevenness for each predetermined range of a plurality of predetermined ranges, aggregating the dispersion calculated for the unevenness group in which the statistical value of the inclination angles of the unevenness falls within a range of the each bin;
for the each bin of the plurality of bins, calculating a dispersion average of the dispersion that has been aggregated; and
selecting the statistical value of the inclination angles of the unevenness in the range of the each bin in which the dispersion average is at a maximum.

4. The image capturing device according to claim 3, wherein
the processor is configured to calculate the statistical value of the inclination angles of the unevenness by further:
calculating a weighted dispersion average obtained by applying a weight to the dispersion average via a number of the unevenness groups aggregated to the each bin; and
selecting the statistical value of the inclination angles of the unevenness in the range of the each bin in which the weighted dispersion average is at a maximum.

5. An image capturing method for irradiating an object capturing reflected light from the object as a reflection image, the method comprising:
determining an irradiation angle range for irradiating the object based on a statistical value of inclination angles of unevenness of an unevenness group in which variation in the inclination angles of the unevenness is larger than a statistical value of another unevenness group, among a plurality of unevenness groups,
wherein each of the plurality of unevenness groups includes a group of pieces of the unevenness existing at a same position on a surface of a plurality of individuals of the object.

6. The image capturing method according to claim 5, further comprising:
calculating the statistical value of the inclination angles of the unevenness based on a measurement result of the unevenness existing on the surface of the plurality of individuals, wherein
the irradiation angle range is determined based on the statistical value of the inclination angles of the unevenness as has been calculated.

7. The image capturing method according to claim 6, wherein
the statistical value of the inclination angles of the unevenness is calculated by:
generating the plurality of unevenness groups from the measurement result of the unevenness;
for each unevenness group of the plurality of unevenness groups, calculating the statistical value and a dispersion of the inclination angles of the unevenness of the group of pieces of the unevenness included in the each unevenness group;
for each bin of a plurality of bins defined by sectioning the statistical values of the inclination angles of the unevenness for each predetermined range of a plurality of predetermined ranges, aggregating the dispersion calculated for the unevenness group in which the statistical value of the inclination angles of the unevenness falls within a range of the each bin;

for the each bin of the plurality of bins, calculating a dispersion average of the dispersion that has been aggregated; and selecting the statistical value of the inclination angles of the unevenness in the range of the each bin in which the dispersion average is at a maximum.

8. The image capturing method according to claim 7, wherein the statistical value of the inclination angles of the unevenness is further calculated by:

calculating a weighted dispersion average obtained by applying a weight to the dispersion average via a number of the unevenness groups aggregated to the each bin; and selecting the statistical value of the inclination angles of the unevenness in the range of the each bin in which the weighted dispersion average is at a maximum.

9. A non-transitory computer-readable storage medium storing a program for causing an image capturing device to perform processing, the image capturing device configured to irradiate an object and capture reflected light from the object as a reflection image, the processing comprising:

determining an irradiation angle range for irradiating the object based on a statistical value of inclination angles of unevenness of an unevenness group in which variation in the inclination angles of the unevenness is larger than a statistical value of another unevenness group, among a plurality of unevenness groups, wherein each of the plurality of unevenness groups includes a group of pieces of the unevenness existing at a same position on a surface of a plurality of individuals of the object.

\* \* \* \* \*